United States Patent
Reaney et al.

(10) Patent No.: US 7,888,520 B2
(45) Date of Patent: Feb. 15, 2011

(54) PROCESS FOR THE PREPARATION OF BIODIESEL

(75) Inventors: Martin J. T. Reaney, Saskatoon (CA); Dushmanthi de A. Jayasinghe, Saskaloon (CA)

(73) Assignee: University of Saskatchewan, Saskatoon, Saskatchewan ( * ) Notice: Subject to any disclaimer, the term of this patent is extended or adjusted under 35 U.S.C. 154(b) by 282 days.

(21) Appl. No.: 12/158,883

(22) PCT Filed: Dec. 21, 2006

(86) PCT No.: PCT/CA2006/002090

§ 371 (c)(1),
(2), (4) Date: Oct. 28, 2008

(87) PCT Pub. No.: WO2007/071046

PCT Pub. Date: Jun. 28, 2007

(65) Prior Publication Data

US 2009/0163730 A1    Jun. 25, 2009

Related U.S. Application Data

(60) Provisional application No. 60/751,982, filed on Dec. 21, 2005.

(51) Int. Cl.
C11B 1/00 (2006.01)
C10M 169/06 (2006.01)

(52) U.S. Cl. .......................... 554/9; 554/174; 508/519; 508/522; 508/539

(58) Field of Classification Search ................. None
See application file for complete search history.

(56) References Cited

U.S. PATENT DOCUMENTS

| | | | |
|---|---|---|---|
| 1,957,437 A * | 5/1934 | Auer | ............... 554/28 |
| 5,424,467 A | 6/1995 | Bram et al. | |
| 5,972,057 A | 10/1999 | Hayafuji et al. | |
| 6,822,105 B1 | 11/2004 | Luxem et al. | |
| 2006/0224005 A1 | 10/2006 | Felly | |

FOREIGN PATENT DOCUMENTS

RO   111694   * 12/1996
WO   00/05327   2/2000

OTHER PUBLICATIONS

RO 111694, Stepan, E. et al, Solvent-based process for manufacture soaps of fatty acid salts from triglycerides, 1996, English language Abstract, 1 page.*

* cited by examiner

Primary Examiner—Porfirio Nazario Gonzalez
Assistant Examiner—Yate' K Cutliff
(74) Attorney, Agent, or Firm—Patricia Folkins; Bereskin & Parr LLP/ S.E.N.C.R.L., s.r.l.

(57) ABSTRACT

The present invention relates to a process of preparing fatty alkyl esters (biodiesel), glycerin and lithium soap comprising: a) transesterifying an oil, fat or grease with a solution of lithium base in a monohydric aliphatic alcohol to produce fatty alkyl esters and a lithium alkaline glycerin; b) separating the fatty alkyl esters and the lithium alkaline glycerin and utilizing the lithium alkaline glycerin to saponify fatty alkyl compounds to produce glycerin and lithium soap; and c) optionally, separating the glycerin and lithium soaps.

23 Claims, 6 Drawing Sheets

PROCESS FOR THE PREPARATION OF BIODIESEL

This application is a National Stage of International Application No. PCT/CA2006/0002090, filed Dec. 12, 2006, which claims the benefit of Provisional Application No. 60/751,982 filed Dec. 21, 2005, the contents of which are herein incorporated by reference.

FIELD OF THE INVENTION

The present invention relates to a process for preparing fatty alkyl esters (biodiesel). In particular the invention relates to a process for preparing biodiesel using a lithium base wherein the lithium alkaline glycerin co-product is used to saponify fatty alkyl compounds to produce desalted glycerin and lithium grease.

BACKGROUND OF THE INVENTION

Plant and animal fat are frequently converted into fatty alkyl esters on an industrial scale where the fatty alkyl esters may serve any number of purposes including use as biodiesel. Most vegetable oils and animal fats are predominantly triacylglycerols (TAGs) also known as triglyceride. Although TAGs may be incorporated into diesel fuels without chemical modification, these compounds increase fuel viscosity, are poorly combusted and tend to prematurely foul upper cylinder engine parts. Therefore, chemical processes for converting fats and oils to alkyl esters of monohydric alcohols are now in common use to produce a fuel with lower viscosity that may be used as a direct replacement for diesel fuel. The core synthetic process of most biodiesel production technologies is transesterification (Ma F. and Hanna M. A. *Bioresource technology* 1999, 70, 1-15). In this process animal fat or vegetable oil consisting mostly of acylglycerols is reacted with a catalyst and alcohol. The products from the reaction are: (1) an alcohol ester of fatty acids (i.e. fatty alkyl esters); (2) co-product alcohol, such as glycerin; (3) unreacted excess aliphatic alcohol; and (4) residual and spent catalyst. The catalyst used in the synthesis of biodiesel is usually potassium or sodium hydroxide. The co-product, glycerin, is not soluble in the fatty alkyl ester. Consequently, upon the completion of the reaction the product separates into two phases, the upper alkyl ester which may contain some alkali soap and the lower glycerin layer, which contains substantial quantities of dissolved basic catalyst and may contain some alkali soap. Scheme 1 shows the transesterification of a triglyceride with three moles of alcohol in the presence of a basic catalyst releasing one mole of glycerin and three moles of fatty alkyl ester (biodiesel).

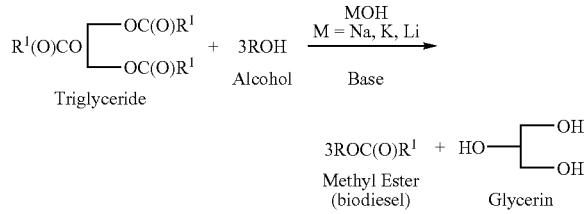

Glycerin, also known as glycerine and glycerol, is the chemical compound 1,2,3-propanetriol. It is a colorless, odorless, hygroscopic, water-soluble viscous liquid. Glycerin is used in soap, cosmetics, creams, foods, and a variety of other uses and is, therefore, a potentially valuable product. However, the glycerin produced in the reaction shown in Scheme 1 must be separated from the basic catalyst before it can be used for these applications. It is common in glycerin recovery procedures to neutralize the basic catalyst with acid to produce a salt solution, and then to distill the neutralized product. This process produces a high quality and high value 99% glycerin solution.

Lithium soap, otherwise known to those skilled in the art as lithium grease, functions as a water resistant lubricant. Lithium grease is useful as a finished product for lubrication or may be formulated into various lithium grease containing lubricant products. Lithium grease is also useful in cosmetic preparations.

In general there is a need for biodiesel manufacturing processes which produce one or more desired products while minimizing the production of waste. In particular there is a need for a method of producing biodiesel that allows for simplified recovery of desalted glycerin.

SUMMARY OF THE INVENTION

It has been found that lithium base is an effective catalyst for the formation of alkylesters from triglycerides and lower alcohols. It has also been found that lithium soaps are highly insoluble in glycerin and that lithium base in solution in glycerin can be easily precipitated and removed by conversion of the lithium base to insoluble lithium soap. Further, it has been found that three useful products, biodiesel, glycerin and lithium grease can be formed in a processes using lithium base catalysts.

Accordingly, the present invention includes a process for the preparation of fatty alkyl esters (biodiesel) comprising:

(a) transesterifying an oil, fat or grease with a solution comprising a lithium base and a monohydric aliphatic alcohol to produce fatty alkyl esters and lithium alkaline glycerin;

(b) separating the fatty alkyl esters from the lithium alkaline glycerin and utilizing the lithium alkaline glycerin to saponify fatty alkyl compounds to produce glycerin and lithium soaps; and (c) optionally, separating the glycerin and lithium soaps.

While lithium bases are similar to other bases in the synthesis of alkyl esters, one of the advantages of the process of the present invention is the use of the side product, lithium alkaline glycerin, to saponify fatty compounds to produce lithium soaps, which are substantially insoluble in the glycerin. The substantially insoluble lithium soaps can be separated from glycerin allowing for the recovery of two useful side products, desalted glycerin and lithium soap. It is a further advantage of the process of the present invention that lithium soaps are less soluble in both glycerin and alkyl ester than their sodium and potassium counterparts. This feature allows for easier isolation of the lithium soap and the desalted glycerin.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

For a better understanding of the present invention and to show more clearly how it would be carried into effect, reference will now be made by way of example, to the accompanying drawings that show preferred embodiment of the present invention, and in which.

DETAILED DESCRIPTION OF THE INVENTION

Figure 1:
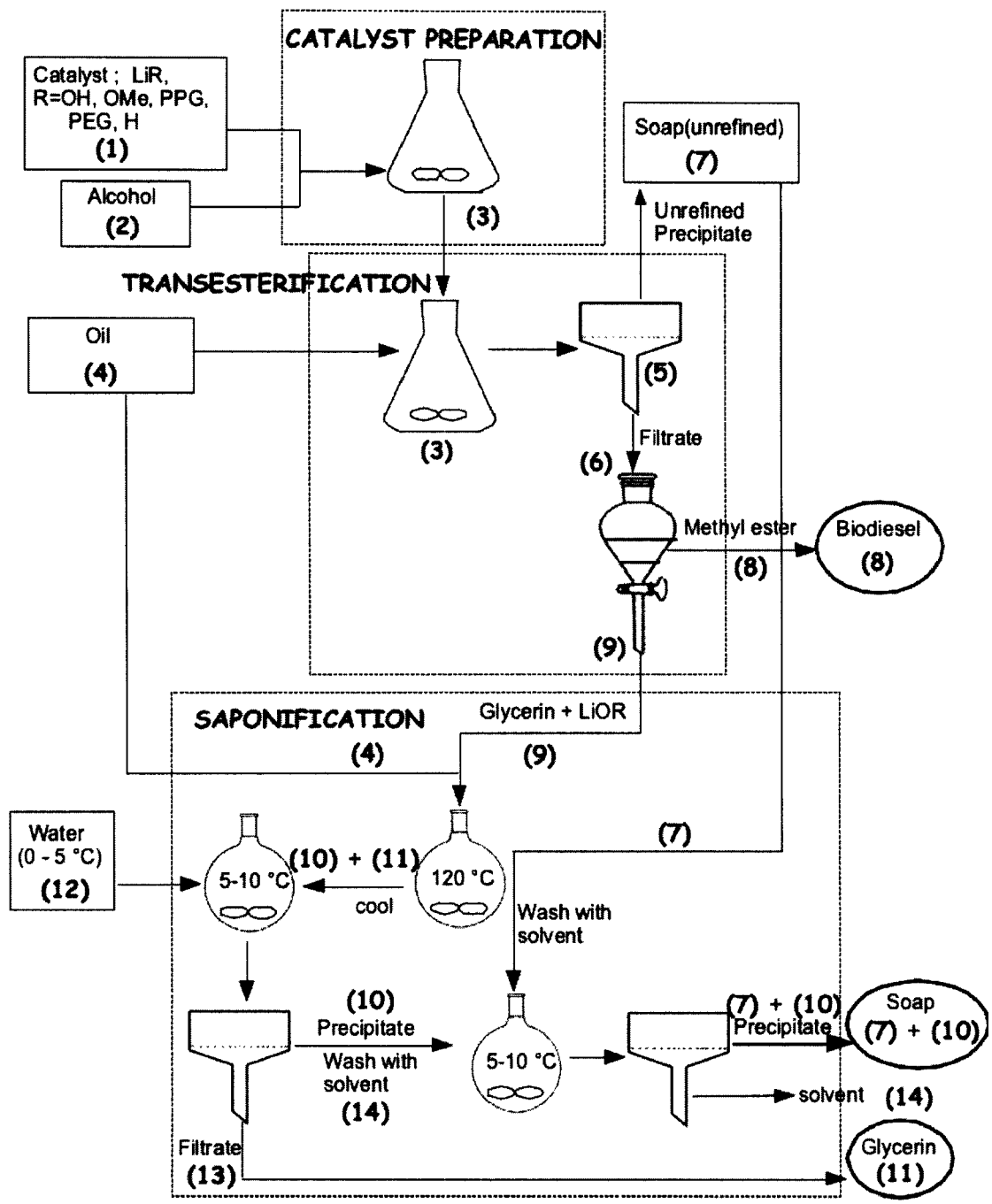
FIG. 1 shows a flow diagram of a first embodiment of the invention having a one stage transesterification followed by saponification.

The term "fatty alkyl" as used herein refers to a long straight or branched chained alkyl group typically having more than 12 carbons atoms.

The term "fatty alkyl ester" as used herein refers to mixed esters generally having at least one fatty alkyl group where the fatty alkyl group is as defined above.

The term "lower alcohol" as used herein refers to an alcohol having from 1 to 6 carbon atoms in a straight, branched or cyclic alkyl chain, for example methanol, ethanol, butanol, amyl alcohol and the like.

The term "biodiesel" as used herein refers to fatty alkyl esters that may be used as fuel.

The term "lithium soap" as used herein refers to a lithium salt of a fatty alkyl acid.

The term "lithium grease" or "water resistant grease" as used herein refers to lithium soap as defined above.

The term "desalted glycerin" as used herein refers to glycerin solutions containing less than 1% by weight residual catalyst or salts.

The term "transesterification" as used herein refers to the reaction of exchanging an alkoxy group of an ester compound with another alcohol. The reaction may be acid or base catalyzed.

The term "saponification" as used herein refers to alkaline hydrolysis of a fatty ester to form an alcohol and the salt of the acid. Suitably, saponification refers to the reaction of a metallic alkali base with a fat or oil to form soap.

The instant invention discloses a process for the production of fatty alkyl ester (biodiesel). The process involves, initially, a transesterification of an oil, fat or grease with a solution of lithium base in a monohydric aliphatic alcohol to produce fatty alkyl esters and lithium alkaline glycerin. Optionally a co-solvent may be used during this transesterification reaction. The co-solvent is one in which all of the reactants are soluble so that the transesterification reaction occurs in one phase. The transesterification may be performed in a single reaction, or alternatively, the fatty ester portion may be reacted two or more times with the addition of further alcohol or further lithium base to ensure complete conversion. Following the transesterification reaction(s), the lithium alkaline glycerin, which is readily separated from the alkyl ester product, for example, by gravity separation in a separatory funnel, is used to saponify fatty alkyl compounds to produce desalted glycerin and lithium soaps. The fatty alkyl esters, desalted glycerin and lithium soap may all be isolated and purified (if necessary) and used as, for example, commercial products.

Accordingly, the present invention includes a process for the preparation of fatty alkyl esters (biodiesel) comprising:

(a) transesterifying an oil, fat or grease with a solution comprising a lithium base and a monohydric aliphatic alcohol to produce fatty alkyl esters and lithium alkaline glycerin;

(b) separating the fatty alkyl esters from the lithium alkaline glycerin and utilizing the lithium alkaline glycerin to saponify fatty alkyl compounds to produce glycerin and lithium soaps; and (c) optionally, separating the glycerin and lithium soaps.

In an embodiment of the invention the oil, fat or grease will contain at least one triglyceride. It is understood in the art that oils, fats and grease optionally contain other fat-soluble compounds in addition to triglycerides, such as, monoglycerides, fatty acids, sterols, phospholipids and unsaponifiables. In a suitable embodiment of the invention the oil, fat or grease is vegetable oil or animal fat. Oils suited to this reaction include, but are not limited to, canola oil, soybean oil, palm oil, sunflower oil, safflower oil, flax oil, solin flax oil, mustard seed fixed oil, coriander seed fixed oil, castor oil, chinese tallow tree oil, cocoa butter oil, coconut oil, corn oil, cottonseed oil, crambe oil, evening primrose oil, peanut oil, hemp seed oil, olive oil, poppy seed oil, rapeseed oil, rice bran oil, sesame oil, tea seed oil and wheat germ. In another embodiment of the invention the vegetable oil is canola oil.

Examples of suitable lithium bases include, but are not limited to, LiOH, lithium alkoxide of a lower alcohol, lithium metal, lithium hydride or Li salts of polyether alcohol resins. In an embodiment of the invention, the lithium base is LiOMe (lithium methoxide), lithium metal, lithium hydride, LiPPG (Li polypropylene glycol) and $LiOH.H_2O$. In a further embodiment of the invention the lithium base is $LiOH.H_2O$ or lithium hydride. In a further embodiment of the invention the lithium catalyst is used at levels as low as 0.05% (wt/wt) of the oil, fat or grease. Suitably, the lithium catalyst is used at a level of 0.1% of the oil, fat or grease.

In an embodiment of the invention the monohydric aliphatic alcohol is a lower alcohol. In a suitable embodiment, the lower alcohol is ethanol, propanol, iso-propanol, amyl alcohol or t-butanol, or an isomeric branched chain alcohol. In a further embodiment, the lower alcohol is methanol.

A person skilled in the art would appreciate that fatty alkyl compound for the saponification reaction may be any fatty alkyl compound capable of forming soap. In an embodiment of the invention, the fatty alkyl compound for the saponification reaction is selected from one or more of lecithin, fatty acids, triglycerides, diglycerides, monoglycerides, fatty acid alkyl esters, fatty acid aryl esters and fatty anhydrides. In a further embodiment of the invention the fatty alkyl compound comprises triglycerides. When the fatty alkyl compound is a fatty acid, mild conditions may be used for the saponification reaction, however when the fatty alkyl compound is a triglyceride oil, elevated temperatures are used for the saponification reaction.

It is common that a certain amount of saponification of the fatty alkyl compounds occurs during the transesterification reaction due to the presence of small amounts of moisture. Lithium soap particles being substantially insoluble, will precipitate from both ester and glycerol layers. In an embodiment of the invention, lithium soap precipitate which may form during the transesterification reaction may be removed by filtration prior to separating the fatty alkyl esters from the lithium alkaline glycerin. Filtration prior to separation enhances the yield of soap. In another embodiment dry catalysts such as LiH, Li, LiOMe and LiPPG are used to limit saponification during transesterification reaction. Although, traces of moisture present in the reactants may result in some saponification even when dry catalysts are used.

The quantity of alcohol present in the transesterification reaction affects the solubility of soap produced during this reaction. In an embodiment of the invention, alcohol is added to the reaction in amounts of greater than 15% of the oil, fat or grease weight. In reactions of this embodiment, precipitates of soap are not observed in the methyl ester layer yet soaps are preferentially deposited in the glycerin layer. This differs from embodiments where free alcohol is lower than 15% of the weight of the oil, fat or grease. In reactions of this embodiment, soap formed during transesterification, are observed to precipitate in the methyl ester and glycerin layers.

In an embodiment of the invention the excess alcohol is removed from the glycerin layer by distillation following transesterification to increase the safety of further reactions, though those skilled in the art will know that the alcohol does not interfere with those further reactions. In one embodiment of the invention, the base content of glycerin is determined after the transesterification reaction by titration of the basic solution using known methods. In a further embodiment of the invention a stoichiometric portion of fresh fatty alkyl compound is added to the glycerin solution in the saponification reaction. This saponification reaction mixture is then stirred under suitable conditions for saponification of the fatty alkyl compound with the residual lithium base to form lithium soaps. Unlike potassium or sodium soaps, the lithium soaps of the instant invention are highly insoluble in glycerin and precipitate affording a low salt glycerin solution after the saponification reaction.

In yet another embodiment of the invention the glycerin and the lithium soaps are each isolated and optionally purified. In a suitable embodiment of the invention the lithium soaps are isolated from the glycerin by filtration. In yet another embodiment the lithium soaps are isolated by filtration through a porous membrane. In still a further embodiment, a solvent in which glycerin is soluble and lithium soap is insoluble is added prior to filtration to encourage precipitation of the lithium soap. In yet a further embodiment of the invention this solvent is chilled water. This latter embodiment yields a well separated soap and glycerin/water mixture and facilitates better separation of reaction products. Also, in this embodiment, glycerol may be easily separated from water by a number of means known to those skilled in the art. In a further embodiment of the invention, the glycerin free soap precipitate can be washed with a fat soluble solvent to remove residual oil and methyl ester which still associate with the soap. In a suitable embodiment of the invention the solvent can be hexane or diethyl ether. These solvents can be easily removed to obtain pure soap.

In an embodiment of the invention, the transesterification reaction may be carried out in the presence of a co-solvent. In a suitable embodiment of the invention the co-solvent is sufficiently soluble such that all of the reactants are in one phase.

In a further embodiment the co-solvent is methyl tertiary butyl ether.

In an embodiment of the present invention the process is comprised of two chemical reactions as shown in Scheme 2. In reaction a) triglyceride obtain from a plant or animal source is converted to alkyl ester by reaction with a lower alcohol in the presence of catalytic lithium base. Concurrent with this reaction some saponification may occur and lithium soaps may be produced. In the reaction b) the glycerin byproduct containing highly reactive lithium base is used to saponify a fatty alkyl compound to form lithium soap. Lithium soaps are highly insoluble in glycerin and methyl ester and may be removed by filtration to leave desalted glycerin and isolated lithium grease.

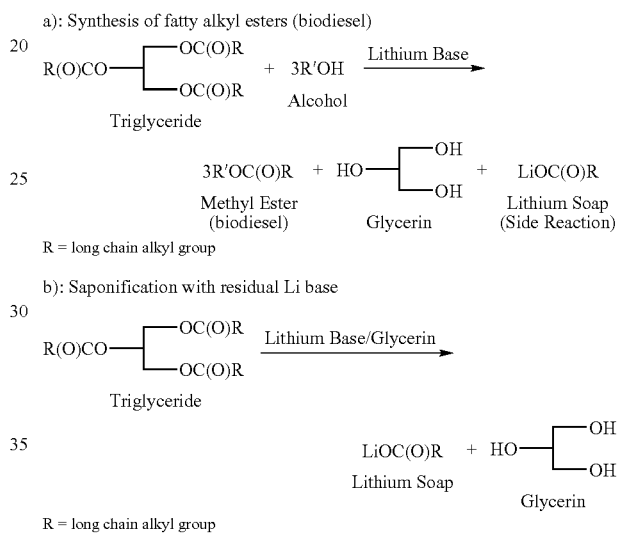

Figure 2:
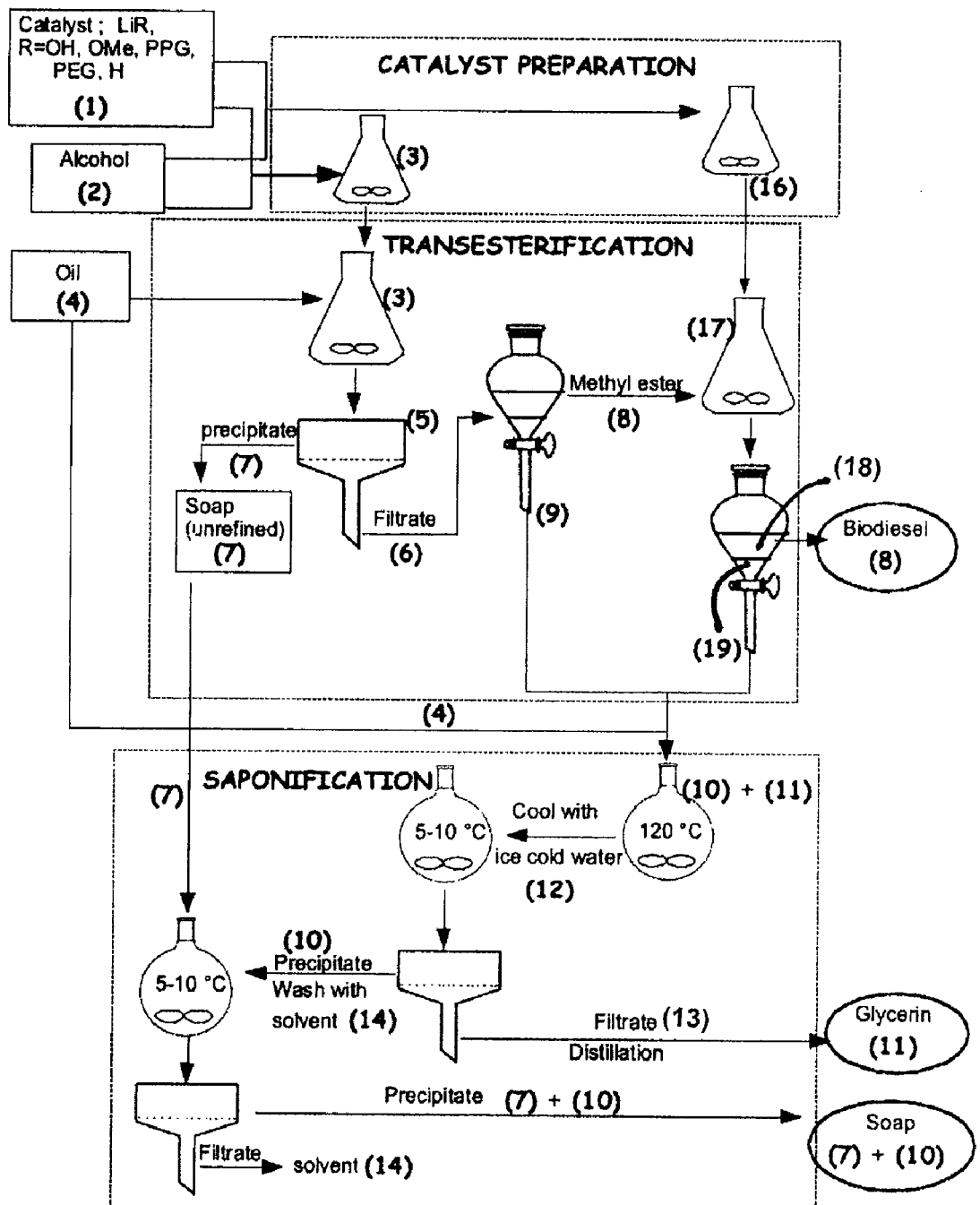
FIG. 2 shows a flow diagram of a second embodiment of the invention having a two stage transesterification followed by saponification.
Figure 3:
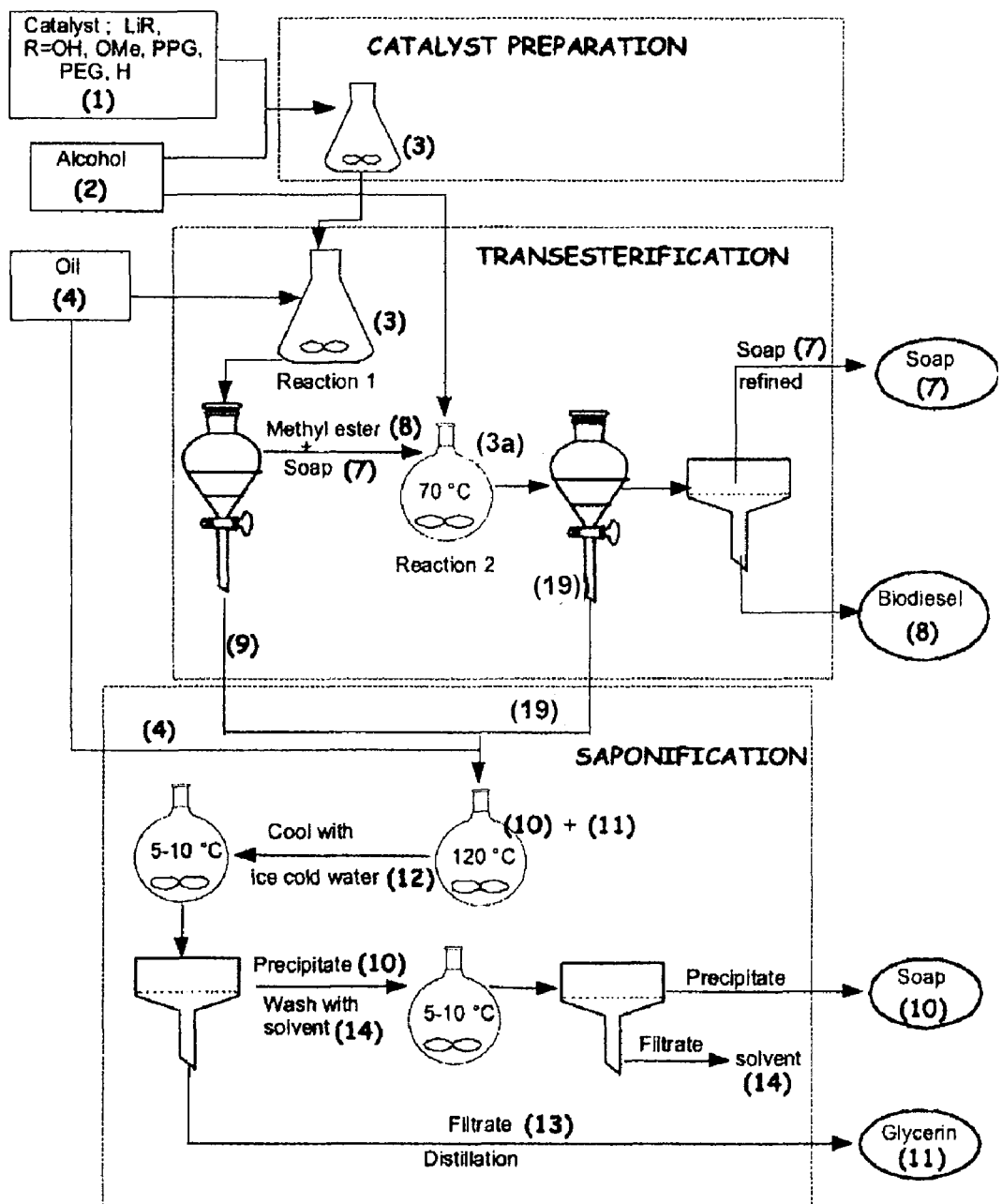
FIG. 3 shows a flow diagram depicting a further embodiment of the invention wherein the alkyl ester layer is treated with a second aliquot of alcohol at elevated temperatures.

Specific embodiments of the process of the invention are depicted in more detail in FIGS. 1 to 3.

FIG. 1 is a flow diagram depicting an embodiment of the invention where the transesterification reaction in performed in a single stage. In this embodiment, the lithium catalyst is prepared by the combination of a lithium base (1) with alcohol (2) in a suitable container (3). After the catalyst is dissolved it is combined with oil (4) and agitated in the same container (3), or alternatively another suitable container. After a suitable reaction time the whole reaction mixture is then filtered using, for example, funnel (5) to give filtrate (6) and unrefined soap (7) as a by-product. The filtrate (6) is separated based on density producing an upper phase of primarily methyl ester (8) and lower phase which comprises lithium alkaline glycerin (9). Both phases will contain residual amounts of alcohol. The lithium alkaline glycerin (9) may be mixed with additional fresh oil (4) and heated to produce lithium soaps (10) in a suspension in glycerin (11). This may be then combined with water (12) and cooled to produce a suspension of lithium soaps (10). Filtration of the soap suspension recovers the precipitated lithium soaps (10) and a filtrate (13) comprising glycerin (11) and water (12). Optionally the soaps (7) and (10) may be combined and washed with suitable solvent (14) for removing polar and non-polar contaminants. Optionally the glycerin (11) may be deionized and excess water evaporated.

In another embodiment of the invention, the alkyl ester layer may be treated with one or more additional portions of alcoholic lithium base to ensure complete transesterification of the triglyceride in the oil, fat or grease. The glycerin layers from all treatments may then be combined for the next step of the process. Accordingly, FIG. 2 is a flow diagram depicting this embodiment of the invention. FIG. 2 shows a catalyst prepared by the combination of a lithium base (1) with alcohol (2) in a suitable container (3). After the catalyst is dissolved it is combined with oil (4) in the same container (3), or alternatively another container, and agitated. After a suitable reaction time the whole reaction mixture is then filtered using, for example, funnel (5) to provide a filtrate (6) and a precipitate (7) (unrefined soap). The filtrate (6) is separated based on density producing an upper phase of primarily methyl ester (8) and lower phase of lithium alkaline glycerin (9). Both phases will contain residual amounts of alcohol. The methyl ester phase (8) may not be completely reacted and a second stage of reaction is common. Additional catalyst (1) and alcohol (2) may be mixed in another suitable container (16) and added to the incompletely reacted ester phase (8). This produces a reaction mixture (17) that when allowed to separate produces an upper phase (18) and lower phase (19). The upper phase with refining is suited for use as biodiesel while the lower phase (19) comprises lithium alkaline glycerine (9). The combined glycerin rich phases (9) and (19) from the first and second transesterification reactions may be combined. Heating the collected glycerin phases either combined or separately with additional oil (4) produces a solution of glycerin (11) and lithium soap (10). This solution may be chilled and diluted with water (12) to produce a filterable suspension of lithium soaps (10) in a suspension in glycerin (11). Filtration of the soap suspension recovers a precipitate (10) and a filtrate (13) of glycerin (11) and water (12). Optionally the soaps (7) and (10) may be combined and washed with suitable solvent (14) for removing polar and non-polar contaminants. Optionally the glycerin (11) may be deionized and excess water evaporated.

FIG. 3 is a flow diagram depicting a further embodiment of the invention wherein the alkyl ester layer is treated with a second aliquot of alcohol at elevated temperatures. In a particular embodiment the reaction is conducted at the reflux temperature of the alcohol. In still another embodiment the reaction is conducted in a pressure vessel. In FIG. 3, a basic lithium catalyst (1) is combined with alcohol (2) in a suitable container (3) and dissolved. The alcohol catalyst mixture is then mixed with a suitable amount of oil (4) in the same container (3), or alternatively in another suitable container, and allowed to react. After reaction, the mixture is placed in a separatory funnel and allowed to settle. Once again, two layers form. The lower lithium alkaline glycerin layer (9) is removed and the upper layer of soap (7) and partially formed methyl ester (8) is transferred to a second reaction flask 3a. The second reaction is conducted at the reflux temperature of the alcohol (2). It may also be beneficial to place the reactants in a pressure vessel. The products of the second reaction are then transferred to a separatory funnel and, after settling, two layers form once again. The upper layer comprises methyl ester, alcohol and lithium soap. This layer is readily separated by filtration to yield a soap retentate (7) and filtrate of biodiesel (8) and alcohol (2). Optionally the retentate soap may be refined to remove adhering reaction products such as methanol, methyl ester and glycerin. The methyl ester may be recovered from the filtrate by evaporation of the excess alcohol and filtration.

This reaction appears to consume most of the lithium base but where lithium base is present in glycerin layers (9 and 19) it is possible to use this base to produce additional lithium soap. This is achieved by combining layers 9 and 19, evaporating all alcohol (2) present, adding oil (4) to the solution and heating the resulting solution to form the soap (10). After soap formation the whole reaction mixture is chilled with ice cold water (12) and filtered. The precipitate (10) is rich in lithium soaps and may be further purified by washing with a non-polar solvent (14) like hexane. The precipitate of the solvent wash step is lithium soap (10). The filtrate is a solvent (14) that may optionally be recycled. The glycerin rich filtrate (13) is low in ionic strength but may contain some water. Residual ions and water may be removed by methods known to those skilled in the art. These methods include ion exchange chromatography and distillation respectively. The glycerin (11) may optionally be distilled or treated with a suitable solid phase absorbent such as activated carbon to improve its qualities.

Figure 4:
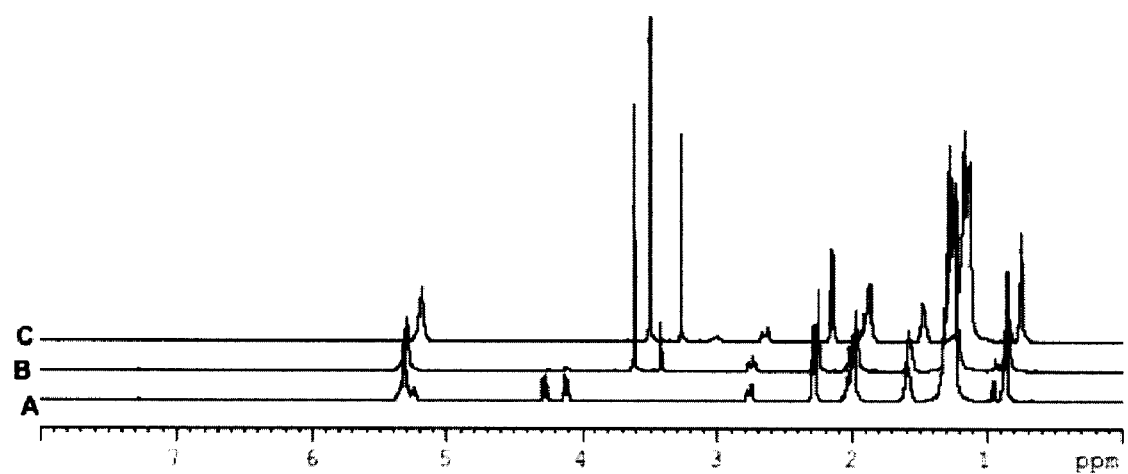
FIG. 4 shows $^1$H NMR spectra in $CDCl_3$ of (A) canola oil, (B) methyl ester layer after one treatment with lithium base and (C) methyl ester layer after two treatments. Gradual disappearance of glyceride protons at 4.29 ppm-4.10 ppm is observed while new singlet due to formation of methyl ester appears at 3.60.

The products of the process of the invention may be assayed using spectral and/or physical analysis. The efficiency of the conversion of triglyceride to methyl ester may be determined using $^1$H-NMR spectroscopy (for example, a Bruker AMX-500 spectrometer at 500 MHz at 23° C.). Disappearance of protons that are correlated with the presence of glycerin is observed by the loss of spectral peaks at 4.29-4.26 and 4.13-4.10 ppm (FIG. 4). The appearance of a singlet in the $^1$H-NMR spectrum at 3.59 ppm is an indication of the formation of methyl esters (FIG. 4). These spectral changes may be used for quantitative determination of the extent of the reaction.

Figure 5:
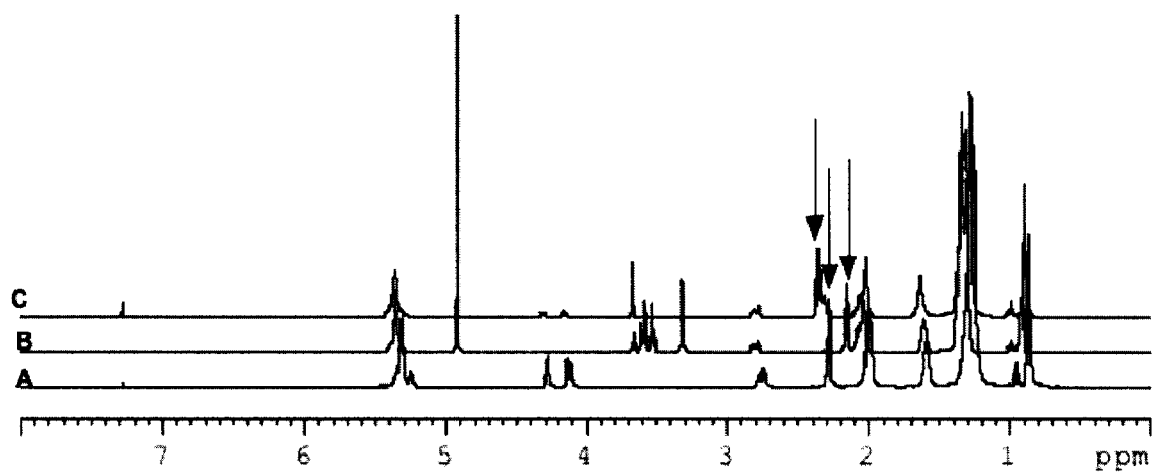
FIG. 5 shows $^1$H NMR spectra of (A) Canola oil (in $CDCl_3$), (B) Li Soap (in MeOD) (C) Fatty acid of the soap (in $CDCl_3$). Note the different chemical shifts of the alpha carbon, in (A) at 2.26, in (B) at 2.09 and in (C) at 2.78.
Figure 6:
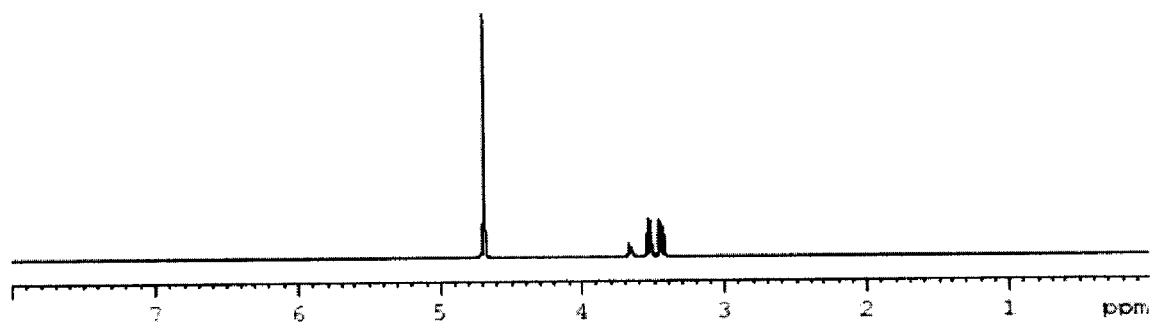
FIG. 6 shows an $^1$H NMR spectrum in $D_2O$ for glycerin distilled from the soap filtrate.

Lithium soap was dissolved in deutero methanol as the solvent and characterized using $^1$H NMR (FIG. 5). A downfield shift of the alpha carbon signal was observed in the soap spectrum (2.09 ppm) that readily distinguished the soap from fatty acids (2.36 ppm), methyl esters (2.24 ppm) and triglycerides (2.26 ppm). In a non-quantitative test the soap sample may be combusted with a Bunsen burner and a characteristic carmine red colour is developed if substantial portions of lithium are present. Texture, melting point, solubility and NMR spectra of acid hydrolysis products were studied for the obtained products.

Alkaline lithium catalysts are known to be effective in the production of alkyl esters. While lithium catalysts are at least as efficient as other alkali catalysts for producing alkyl esters, their higher cost has made them unfavorable for this commercial application. However, by coupling the second reaction converting the lithium base to lithium soap it is possible to take advantage of the unique property of lithium soaps that they are highly insoluble in glycerin and methyl ester. Analogous soaps of sodium and potassium are more soluble in glycerin and methyl ester and they are therefore more difficult to isolate. As a result, recovery of glycerin, which is a useful product in its own right, is more difficult when sodium and potassium catalysts are used. Furthermore the lithium soaps produced in the first and/or second steps of the reaction are also a commercially desirable product. By the addition of the second reaction step, the use of lithium bases for production of alkyl esters, which was previously not cost effective, becomes more efficient than other previously used catalysts due to the production and ease of isolation of two additional commercially useful products, namely glycerin and lithium grease. It is a unique property of the reaction that all co-products can be produced efficiently when compared with existing art.

The products of these reactions have many useful functions. Fatty alkyl esters may be used as fuels such as biodiesel and as intermediates in the synthesis of a broad range of synthetic chemicals. The low salt glycerin may be distilled to yield 99% glycerin which may be used on its own or as a precursor for nitroglycerin production with little further refining. The lithium grease may be used as a finished product for the cosmetic industry, lubrication or beneficially formulated into a number of lithium grease containing lubricant products.

The following non-limiting examples are illustrative of the present invention:

EXAMPLES

Example 1

Preparation of Biodiesel, Desalted Glycerin and Lithium Grease in a Two Stage Reaction

Step 1

Preparation of Canola Methyl Ester Using Methanol in the Presence of Monohydrated Lithium Hydroxide Reaction 1:

To a clean and dry erlenmeyer flask equipped with a Teflon coated stirring bar were added monohydrated lithium hydroxide (0.4 g, 0.4%) and HPLC grade methanol solution (0.375 mol, 12 g) and the reaction mixture was stirred at room temperature until all the solid dissolves. Mild heat was supplied during dissolution. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap could be observed in the media. The solid soap was filtered under vacuum and the flask contents were transferred to a 200 mL glass separatory funnel. After two hours of separation, two layers could be seen; the upper light and cloudy methyl ester layer and the lower dark and transparent glycerin layer. The lower layer was drained into a 100 mL round bottom flask while leaving the upper layer in the funnel.

Reaction 2:

To a clean and dry Erlenmeyer flask equipped with a Teflon coated stirring bar were added monohydrated lithium hydroxide (0.3 g) and HPLC grade methanol solution (10 g) and the mixture was stirred at room temperature until all the solid dissolved. The methyl ester layer from $1^{st}$ reaction was transferred into the same vessel and stirred for 2 hours then transferred to a glass separatory funnel and allowed to separate overnight. The following morning two layers were observed, an almost transparent yellow methyl ester layer on top and a darker transparent glycerin layer on the bottom. The glycerin layers obtained in reactions 1 and 2 were combined.

Step 2

Saponification with Unused Lithium Base

The alkalinity of the glycerin layer was determined by means of a simple acid-base titration to determine the number of dissolved and unused lithium hydroxide moles. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The glycerin portion containing residual catalyst and unreacted methanol was subjected to reduced pressure evaporation to remove the methanol solvent completely. A portion of ninety percent of the stoichiometric ratio of the triglyceride was taken for the saponification with the residual lithium hydroxide. One mole of lithium will react with 0.33 moles of triglyceride. A weighed amount of oil was mixed with the glycerin layer already separated into the 100 mL round bottom flask and stirred at 120° C. for ½ hr. The flask contents were then cooled, first by running cold water, then submerged in an ice bath for about 30 min. A well-formed white precipitate was observed. The solution was stirred with ice water in an ice bath (>-5° C.) to strip the soap from glycerin. The solution was filtered under vacuum to separate the solid soaps. The soap material was again stirred with cold hexane to remove any non-polar material and filtered again. An off white greasy material was recovered as the product with a yield of 50-60% from the original catalyst used.

Example 2

Preparation of Methyl Ester, Desalted Glycerin and Lithium Grease in the Presence of Monohydrated Lithium Hydroxide Using Higher Quantity of Excess Methanol to Study the Behavior of Solubility of Soap

Step 1

Preparation of Canola Methyl Ester Using Excess Methanol in the Presence of Monohydrated Lithium Hydroxide and Increased Alcohol Reaction 1:

To a clean and dry Erlenmeyer flask equipped with a Teflon coated stirring bar were added monohydrated lithium hydroxide (0.4 g, 0.4%) and HPLC grade methanol solution (0.5 mole, 16 g) and the reaction mixture was stirred at room temperature until all the solid dissolves. Mild heat was supplied during dissolution. Commercial canola oil, (0.1 mole, 100 g) obtained from a local grocery store, was added to the same flask. All the contents were well mixed and allowed to react for two hours under medium stirring. After 2 hours, agitation was stopped and a mostly clear solution was observed. The flask contents were transferred to a 200 mL glass separatory funnel. After two hours of separation, two layers could be seen; the upper light and cloudy methyl ester layer and the lower dark and transparent glycerin layer. The lower layer was drained into a 100 mL round bottom flask while leaving the upper layer in the funnel.

Reaction 2:

To a clean and dry Erlenmeyer flask equipped with a Teflon coated stirring bar were added monohydrated lithium hydroxide (0.3 g) and HPLC grade methanol solution (12 g) and the mixture was stirred at room temperature until all the solid dissolved. The methyl ester layer from $1^{st}$ reaction was transferred into the same vessel and stirred for 2 hours then transferred to a glass separatory funnel and allowed to separate overnight. The following morning two layers were observed, an almost transparent yellow methyl ester layer on top and a darker transparent glycerin layer on the bottom. The glycerin layers obtained in reactions 1 and 2 were combined.

Step 2

Saponification with Unused Lithium Base

The alkalinity of the glycerin layer was determined by means of a simple acid-base titration to determine the content of residual lithium hydroxide catalyst. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The glycerin portion containing residual catalyst and unreacted methanol was subjected to reduced pressure evaporation to remove the methanol solvent completely. A portion of ninety percent of the stoichiometric ratio of the triglyceride was taken for the saponification with the residual lithium hydroxide. It is considered that one mole of lithium will react with 0.33 moles of triglyceride. A weighed amount of oil was mixed with the glycerin layer already separated into the 100 mL round bottom flask and stirred at 120° C. for ½ hr. The flask contents were then cooled, first by running cold water, then submerged in an ice bath for about 30 min. A well-formed white precipitate was observed. The solution was stirred with ice water in an ice bath (>−5° C.) to strip the soap from glycerin. The solution was filtered under vacuum to separate the solid soaps. The soap material was again stirred with cold hexane to remove any dissolved oil or residual non-polar materials and filtered again. An off white greasy material was recovered as the product with a yield ranging from 50-60% from the original catalyst used.

Example 3

Synthetic Process for the Preparation of Biodiesel, Desalted Glycerin and Lithium Grease in the Presence of Monohydrated Lithium Hydroxide in the 1$^{st}$ Reaction and Potassium Hydroxide in the 2$^{nd}$ Reaction Step 1

Preparation of Canola Methyl Ester Using Methanol in the Presence of Monohydrated Lithium Hydroxide Reaction 1:

To a clean and dry Erlenmeyer flask equipped with a Teflon coated stirring bar were added monohydrated lithium hydroxide (0.4 g, 0.4%) and HPLC grade methanol solution (0.375 mol, 12 g) and the reaction mixture was stirred at room temperature until all the solid dissolves. Mild heat was supplied during dissolution. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap could be observed in the media. The solid soap was filtered under vacuum and flask contents were transferred to a 200 mL glass separatory funnel. After two hours of separation, two layers could be seen; the upper light and cloudy methyl ester layer and the lower dark and transparent glycerin layer. The lower layer was drained into a 100 mL round bottom flask while leaving the upper layer in the funnel.

Reaction 2:

To a clean and dry Erlenmeyer flask equipped with a Teflon coated stirring bar were added potassium hydroxide (0.4 g) and HPLC grade methanol solution (10 g) and the mixture was stirred at room temperature until all the solid dissolved. The methyl ester layer from 1$^{st}$ reaction was transferred into the same vessel and stirred for 2 hours then transferred to a glass separatory funnel and allowed to separate overnight. The following morning two layers were observed, an almost transparent yellow methyl ester layer on top and a darker transparent glycerin layer on the bottom. The methyl ester layer was studied by $^1$H NMR (FIG. 4, (B)) to determine the completion of the conversion. The second reaction was catalyzed by potassium hydroxide.

Step 2

Saponification with Unused Lithium Base

The alkalinity of the glycerin layer from the lithium catalyzed reaction was determined by means of a simple acid-base titration to determine the number of dissolved and unused lithium hydroxide moles. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The glycerin portion containing residual catalyst and unreacted methanol was subjected to reduced pressure evaporation to remove the methanol solvent completely. A portion of ninety percent of the stoichiometric ratio of the triglyceride or the fatty acid was taken for the saponification with the residual lithium hydroxide. It is considered that one mole of lithium will react with 0.33 moles of triglyceride. A weighed amount of oil was mixed with the glycerin layer already separated into the 100 mL round bottom flask and stirred at 120° C. for ½ hr. The flask contents were then cooled, first by running cold water, then submerged in an ice bath for about 30 min. A well-formed white precipitate was observed. The solution was stirred with ice water in an ice bath (>−5° C.) to dissolve glycerin adhering to the soap. The solution was filtered under vacuum to separate the solid soaps. The soap material was then stirred with cold hexane to remove and filtered to remove non-polar materials. An off-white greasy material was recovered as the product with a yield of 50-60% based on the quantity of lithium catalyst.

Example 4

Synthetic Process for the Preparation of Biodiesel, Desalted Glycerin and Lithium Grease in the Presence of Anhydrous Lithium Hydride in Both Reactions Step 1

Preparation of Canola Methyl Ester Using Methanol in the Presence of Lithium Hydride Reaction 1:

Lithium hydride (0.2 g, 0.2%) was weighed separately. To a clean and dry Erlenmeyer flask equipped with a Teflon coated stirring bar were added dry methanol solution (0.375 mol, 12 g). Lithium hydride was added slowly to the methanol allowing time to react between each addition. Evolution of hydrogen gas was observed during the addition. The reaction mixture was stirred at room temperature until all solids dissolved and the active anhydrous catalyst lithium methoxide had formed. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap could be observed in the media. The solid soap was filtered under vacuum and flask contents were transferred to a 200 mL glass separatory funnel. After two hours of separation, two layers could be seen; the upper light and cloudy methyl ester layer and the lower dark and transparent glycerin layer. The lower layer was drained into a 100 mL round bottom flask while leaving the upper layer in the funnel.

Reaction 2:

Lithium hydride (0.1 g, 0.1%) was weighed separately. To a clean and dry Erlenmeyer flask equipped with a Teflon coated stirring bar were added dry methanol solution (0.31 mol, 10 g). Lithium hydride was added slowly to the methanol allowing time to react between each addition. Evolution of hydrogen gas was observed during the addition. The reaction mixture was stirred at room temperature until all solids dissolved and the active anhydrous catalyst lithium methoxide had formed. The methyl ester layer from the 1$^{st}$ reaction was transferred into the same vessel and stirred for 2 hours and then transferred to a glass separatory funnel and allowed to separate overnight. The following morning two layers were observed, an almost transparent yellow methyl ester layer on top and a darker transparent glycerin layer on the bottom. The glycerin layers obtained in reactions 1 and 2 were combined.

Step 2

Saponification with Unused Lithium Base

The alkalinity of the glycerin layer was determined by means of a simple acid-base titration to determine the number of dissolved and unused lithium hydroxide moles. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The glycerin portion containing residual catalyst and unreacted methanol was subjected to reduced pressure evaporation to remove the methanol solvent completely. A portion of ninety percent of the stoichiometric ratio of the triglyceride or the fatty acid was taken for the saponification with the residual lithium hydroxide. It is considered that one mole of lithium will react with 0.33 moles of triglyceride. A weighed amount of oil was mixed with the glycerin layer already separated into the 100 mL round bottom flask and stirred at 120° C. for ½ hr. The flask contents were then cooled, first by running cold water, then submerged in an ice bath for about 30 min. A well-formed white precipitate was observed. The solution was stirred with ice water in an ice bath (>−5° C.) to strip the soap from glycerin. The solution was filtered under vacuum to separate the solid soaps. The soap material was again stirred with cold hexane to remove any non-polar material. An off white greasy material was recovered as the product with a yield of 50-60% from the original catalyst used.

Example 5

Synthetic Process for the Preparation of Biodiesel, Desalted Glycerin and Lithium Grease in the Presence of Anhydrous Lithium Polypropylene Glycol in Both Reactions Step 1

Preparation of Canola Methyl Ester Using Methanol in the Presence of Lithium Polypropylene Glycol Preparation of Lithium Polypropylene Glycol/Methanol Media for Reaction 1

To a dry and clean 100 mL Schlenk flask equipped with a Teflon coated stirring bar was added monohydrated lithium hydroxide (0.4 g, 0.4%). Water was added slowly to the flask with vigorous stirring. After dissolution of the base in water polypropylene glycol (PPG-425; 2.8 g) was added to the flask. The flask contents were then stirred under vacuum at 120° C. until all the water is evaporated, indicated by the end of bubbling inside the flask. After cooling the flask contents to room temperature dry methanol (12 g) was added and the contents stirred for 30 minutes to dissolve the catalyst in the alcohol.

Reaction 1:

The freshly prepared lithium polypropylene glycol/methanol solution was added to a clean and dry Erlenmeyer flask equipped with a Teflon coated stirring bar. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap could be observed in the media. The solid soap was filtered under vacuum and flask contents were transferred to a 200 mL glass separatory funnel. After two hours of separation, two layers could be seen; the upper light and cloudy methyl ester layer and the lower dark and transparent glycerin layer. The lower layer was drained into a 100 mL round bottom flask while leaving the upper layer in the funnel.

Preparation of Lithium Polypropylene Glycol/Methanol Media for Reaction 2.

To a dry and clean 100 mL Schlenk flask equipped with a Teflon coated stirring bar was added monohydrated lithium hydroxide (0.3 g, 0.3%). Water was added slowly to the flask with vigorous stirring. After dissolution of the base in water polypropylene glycol (1.7 g) was added to the flask. The flask contents were then stirred under vacuum at 120° C. until all the water is evaporated, indicated by the end of bubbling inside the flask. After cooling the flask contents to room temperature dry methanol (10 g) was added and the contents stirred for 30 minutes to dissolve the catalyst in the alcohol.

Reaction 2:

The freshly prepared lithium polypropylene glycol/methanol solution was added to a clean and dry Erlenmeyer flask equipped with a Teflon coated stirring bar. Commercial canola oil, (0.1 mol, 100 g) obtained from a local grocery store was added to the same flask. All the contents were well mixed and allowed to react for two hours under medium stirring. The methyl ester layer from 1$^{st}$ reaction was transferred into the same vessel and stirred for 2 hours then transferred to a glass separatory funnel and allowed to separate overnight. The following morning two layers were observed, an almost transparent yellow methyl ester layer on top and a darker transparent glycerin layer on the bottom. The glycerin layers obtained in reactions 1 and 2 were combined.

Step 2

Saponification with Unused Lithium Base

The alkalinity of the glycerin/PPG layer was determined by means of a simple acid-base titration to determine the lithium hydroxide content. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The glycerin portion containing residual catalyst and unreacted methanol was subjected to reduced pressure evaporation to remove the methanol solvent completely. A portion of ninety percent of the stoichiometric ratio of the triglyceride was taken for the saponification with the residual lithium hydroxide. It is considered that one mole of lithium will react with 0.33 moles of triglyceride A weighed portion of oil was mixed with the glycerin layer in the 100 mL round bottom flask and stirred at 120° C. for ½ hr. The flask contents were then cooled, first by running cold water, then submerged in an ice bath for about 30 min. A well-formed white precipitate was observed. The solution was stirred with ice water in an ice bath (>−5° C.) to strip the soap from glycerin. The solution was filtered under vacuum to separate the solid soaps. The soap material was then stirred with cold hexane to remove any dissolved non-polar material. An off white greasy material was recovered as the product with a yield of 50-60% from the original catalyst used.

Example 6

Synthetic Process for the Preparation of Biodiesel, Desalted Glycerin and Lithium Grease in the Presence of Anhydrous Lithium Polyethylene Glycol in Both Reactions Step 1

Preparation of Canola Methyl Ester Using Methanol in the Presence of Lithium Polyethylene Glycol Preparation of Lithium Polyethylene Glycol/Methanol Media for Reaction 1.

To a dry and clean 100 mL Schlenk flask equipped with a Teflon coated stirring bar weighed was monohydrated lithium hydroxide (0.4 g, 0.4% wt/wt). Water was added slowly to the flask with vigorous stirring. After dissolution of the base in water polyethylene glycol (PEG 600) (5 g) was added to the flask. The flask contents were then stirred under vacuum at 120° C. until all the water was evaporated, indicated by the end of bubbling inside the flask. After cooling the flask contents to room temperature, dry methanol (3.75 eqv, 0.375 mol, 12 g) was added and the contents stirred for 30 minutes to dissolve the catalyst in the alcohol.

Reaction 1:

The freshly prepared anhydrous lithium polyethylene glycol/methanol solution was added to a clean and dry Erlenmeyer flask equipped with a Teflon coated stirring bar. Commercial canola oil, (1 eqv, 0.1 mol, 100 g) obtained from a local grocery store was added to the same flask. All the contents were well mixed and allowed to react for two hours under medium stirring. After 2 hours, agitation was stopped and a uniformly distributed thick precipitation of soap could be observed in the media. The solid soap was filtered under vacuum and flask contents were transferred to a 200 mL glass separatory funnel. After two hours of separation, two layers could be seen; the upper light and cloudy methyl ester layer and the lower dark and transparent glycerin layer. The lower layer was drained into a 100 mL round bottom flask while leaving the upper layer in the funnel.

Preparation of Lithium Polyethylene Glycol/Methanol Media for Reaction 2.

To a dry and clean 100 mL Schlenk flask equipped with a Teflon coated stirring bar weighed was monohydrated lithium hydroxide (0.3 g, 0.3% wt/wt). Water was added slowly to the flask with vigorous stirring. After dissolution of the base in water polyethylene glycol (PEG 600; 2.5 g) was added to the flask. The flask contents were then stirred under vacuum at 120° C. until all the water had evaporated, indicated by the end of bubbling inside the flask. After cooling the flask contents to room temperature, dry methanol (3.1 eqv, 0.31 mol, 10 g) was added and the contents stirred for 30 minutes to dissolve the catalyst in the alcohol.

Reaction 2:

The freshly prepared lithium polyethylene glycol/methanol solution was added to a clean and dry Erlenmeyer flask equipped with a Teflon coated stirring bar. The methyl ester layer from $1^{st}$ reaction was transferred into the same vessel and stirred for 2 hours then transferred to a glass separatory funnel and allowed to separate overnight. The following morning two layers were observed, an almost transparent yellow methyl ester layer on top and a darker transparent glycerin layer on the bottom. The glycerin layers obtained in reactions 1 and 2 were combined.

Step 2

Saponification with Unused Lithium Base

The alkalinity of the glycerin/PEG layer was determined by means of a simple acid-base titration to determine the lithium hydroxide content. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The unreacted methanol in the glycerin portion was removed by evaporation under vacuum. Residual lithium was saponified using 90 percent molar equivalence of the triglyceride with respect to the quantified lithium hydroxide (1 eqv).

Canola oil (0.9 eqv based on the available Li base in the glycerin) was added to the glycerin already transferred into a 100 mL round bottom flask and stirred for 30 min at 120° C. The flask contents were then cooled to room temperature and left until the soap precipitated. (the precipitation was accelerated by submerging the flask in an ice bath for about 30 min) A well-formed white precipitate was observed. The solution was stirred with ice water in an ice bath (>5° C.) to strip the soap from glycerin. The solution was filtered under vacuum to separate the solid soaps. The soap material was again stirred with cold hexane to remove any non-polar material and filtered again. An off white greasy material was recovered as the product with 60-70% of yield with respect to the amount of the lithium involved in the total reaction.

The glycerin/PEG mixture was separated from vacuum distillation at a temperature of 230° C.

Example 7

Synthetic Process for the Preparation of Biodiesel, Desalted Glycerin and Lithium Grease in the Presence of Anhydrous Lithium Polypropylene Glycol in $1^{st}$ Reaction and No Additional Catalyst in the $2^{nd}$ Conversion Using the Residual Catalyst in the Form of Soap in the Media Step 1

Preparation of Canola Methyl Ester Using Methanol in the Presence of Lithium Polypropylene Glycol Preparation of Lithium Polypropylene Glycol/Methanol Media for Reaction 1

To a dry and clean 100 mL Schlenk flask equipped with a Teflon coated stirring bar weighed was monohydrated lithium hydroxide (0.4 g, 0.4% wt/wt). Water was added slowly to the flask with vigorous stirring. After dissolution of the base in water polypropylene glycol (PPG-425; 2.8 g) was added to the flask. The flask contents were then stirred under vacuum at 120° C. until all the water is evaporated, indicated by the end of bubbling inside the flask. After cooling the flask contents to room temperature, dry methanol (3.75 eqv, 0.375 mol, 12 g) was added and the contents stirred for 30 minutes to dissolve the catalyst in the alcohol.

Reaction 1:

The freshly prepared lithium polypropylene glycol/methanol solution was added to a clean and dry Erlenmeyer flask equipped with a Teflon coated stirring bar. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap was observed in the medium. After two hours of separation, two layers could be seen; the upper methyl ester layer with precipitated soap and the lower dark and transparent glycerin layer. The lower glycerin layer was drained into a 100 mL round bottom flask while leaving the upper methyl ester layer and the solids in the funnel.

Reaction 2:

Twelve grams of methanol was added to a 250 mL round bottom flask. The methyl ester layer containing the unfiltered solid from $1^{st}$ reaction was transferred into the same flask and stirred for 2 hours in a 70° C. hot water bath. The contents of the flask were transferred to a glass separatory funnel and allowed to separate overnight. The following morning two layers were observed, an almost transparent yellow methyl ester layer on top, precipitate of soap and a darker transparent glycerin layer on the bottom. The glycerin layers obtained in reactions 1 and 2 were combined, the soap precipitate was filtered and refined by evaporating the solvents and filtering. The soap material was stirred with cold hexane to remove any non-polar material and filtered. An off white greasy material was recovered as the product with 60-70% of yield with respect to the amount of the lithium involved in the total reaction.

Step 2

Saponification with Unused Lithium Base

The alkalinity of the glycerin/PEG layer was determined by means of a simple acid-base titration to determine the lithium hydroxide content. In this reaction the combined glycerin layers did not indicate any presence of Li base residuals and thus no saponification with the unused base was necessary.

Example 8

Synthetic Process for the Preparation of Biodiesel, Desalted Glycerin and Lithium Grease in the Presence of Lithium Hydride in the $1^{st}$ Reaction and Soaps in the Second Reaction Step 1

Preparation of Canola Methyl Ester Using Methanol in the Presence of Lithium Hydride Preparation of Lithium Methoxide for Reaction 1.

To a dry and clean 100 mL Schlenk flask equipped with a Teflon coated stirring bar weighed was lithium hydride (0.05 g, 0.05% wt/wt). Anhydrous methanol (12 g) was added slowly to the flask with continuous stirring in a fume hood until all the hydrogen gas is evolved and the catalytic solution is clear. Those skilled in the art will know that this reaction produces a solution of lithium methoxide in methanol.

Reaction 1:

The freshly prepared lithium methoxide solution was added to a clean and dry Erlenmeyer flask equipped with a Teflon coated stirring bar. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap was observed in the reaction mixture. After the separation, two layers could be seen; the upper light and cloudy methyl ester layer and the lower dark and transparent glycerin layer. The lower glycerin layer was drained into a 100 mL round bottom flask while leaving the upper methyl ester layer with the formed solid precipitate in the funnel.

Reaction 2:

Separately weighed 12 g of methanol was added into a 250 mL round bottom flask. The methyl ester layer containing the solid from $1^{st}$ reaction was transferred into the same flask and stirred for 2 hours in a 70° C. hot water bath. The contents of the flask was then transferred into a glass separatory funnel and allowed to separate overnight. The following morning two layers were observed, an almost transparent pale yellow methyl ester layer on top, solid precipitate of soap and a darker transparent glycerin layer on the bottom. The glycerin layers obtained in reactions 1 and 2 were combined, the soap precipitate was filtered and the biodiesel refined by evaporating the solvents and filtering. The soap material was stirred with cold hexane to remove any non-polar material and filtered. An off white greasy material was recovered as the product with 60-70% of yield with respect to the amount of the lithium involved in the total reaction.

Step 2

Saponification with Unused Lithium Base

The alkalinity of the glycerin/PPG layer was determined by means of a simple acid-base titration to determine the lithium hydroxide content. In this reaction the combined glycerin layers did not indicate any presence of Li base residues and thus no saponification with unused base was necessary.

Example 9

Synthetic Process for the Preparation of Biodiesel, Desalted Glycerin and Lithium Grease in the Presence of Lithium Hydride in $1^{st}$ Reaction and the Same Catalyst in the $2^{nd}$ Conversion in the Presence of a Co-Solvent to Obtain a Single Phase Reaction

Step 1

Preparation of Canola Methyl Ester Using Methanol in the Presence of Lithium Hydride Preparation of Lithium Methoxide for Reaction 1.

To a dry and clean 100 mL Schlenk flask equipped with a Teflon coated stirring bar weighed was lithium hydride (0.05 g, 0.05% wt/wt). Dry methanol (8.75 eqv, 0.875 mol, 28 g) was added slowly to the flask with continuous stirring in a fume hood until all the hydrogen gas is evolved and the catalytic solution is clear.

Reaction 1:

The freshly prepared lithium methoxide solution was added to a clean and dry Erlenmeyer flask equipped with a Teflon coated stirring bar. Commercial canola oil, (1 eqv, 0.1 mol, 100 g) obtained from a local grocery store and t-methyl butyl ether (45 g) was added to the same flask to obtain one phase for all the reactants. All the contents were well mixed and allowed to react for two hours under medium stirring. After 2 hours, agitation was stopped and the solvents were evaporated by vacuum evaporation. The contents were transferred into a separatory funnel for separation. After the separation, two layers could be seen; the upper light but cloudy methyl ester layer and the lower dark and transparent glycerin layer. The lower glycerin layer was drained into a 100 mL round bottom flask, the soap precipitate was filtered and refined and collected the biodiesel.

Step 2

Saponification with Unused Lithium Base

The alkalinity of the glycerin layer was determined by means of a simple acid-base titration to determine the lithium hydroxide content. A 0.015 mL portion of the glycerin layer was transferred into a 125 mL Erlenmeyer flask using a pipette. This solution was diluted with 10.0 mL of water. Phenolphthalein indicator (3-4 drops) was added until the solution turned pink. The sample was then titrated to a colorless end point with 0.001M HCl solution.

The residual solvents in the glycerin portion was removed by evaporation under vacuum. Residual lithium was used to saponify triglycerides by adding 90 percent molar equivalence of the triglyceride with respect to the quantified lithium hydroxide (1 eqv).

Canola oil (0.9 eqv based on the available Li base in the glycerin) was added to the glycerin already transferred into a 100 mL round bottom flask and stirred for 30 min at 120° C. The flask contents were then cooled to room temperature and left until the most of the soap precipitated. (30 min) A well-formed white precipitate was observed. The solution was stirred with ice water in an ice bath (>5° C.) to strip the soap from glycerin. The solution was filtered under vacuum to separate the solid soaps. The soap material was again stirred with cold hexane to remove any non-polar material and filtered again. An off white greasy material was recovered as the product with 60-70% of yield with respect to the amount of the lithium involved in the total reaction.

Example 10

Second Reaction does not Occur if the Catalyst is Removed by Filtration Between the First and Second Stage Reaction All conditions are similar to example seven except that soap that formed in the methyl ester layer during the first reaction was removed by filtration.

Step 1

Preparation of Canola Methyl Ester Using Methanol in the Presence of Lithium Hydride Preparation of Lithium Methoxide for Reaction 1.

To a dry and clean 100 mL Schlenk flask equipped with a Teflon coated stirring bar was added lithium hydride (0.05 g, 0.05% wt/wt). Dry methanol (12 g) was added slowly to the flask with continuous stirring in a fume hood until all the hydrogen gas is evolved and the catalytic solution is clear.

Reaction 1:

The freshly prepared lithium methoxide solution was added to a clean and dry Erlenmeyer flask equipped with a Teflon coated stirring bar. Commercial canola oil, (0.1 mol, 100 g) obtained from a local grocery store was added to the same flask. All the contents were well mixed and allowed to react for two hours under medium stirring. After 2 hours, agitation was stopped and a uniformly distributed thick precipitation of soap was observed in the media. The solid soap was filtered under vacuum and flask contents were transferred to a 200 mL glass separatory funnel. After the separation, two layers could be seen; the upper light and cloudy methyl ester layer and the lower dark and transparent glycerin layer. The lower glycerin layer was drained into a 100 mL round bottom flask while leaving the upper methyl ester layer with the formed solid precipitate in the funnel.

Reaction 2:

Twelve grams of dry methanol was added to a 250 mL round bottom flask equipped with a Teflon coated stirring bar. The methyl ester layer free from the solid from 1st reaction was transferred into the same flask and stirred for 2 hours in a 70° C. hot water bath. The contents of the flask was then transferred into a glass separatory funnel and allowed to separate overnight. The following morning two layers were observed, an almost transparent yellow methyl ester layer on top and a light transparent layer on the bottom. The NMR analysis of the degree of transesterfication from the 2nd reaction does not show any further progress from that of the NMR taken from the 1st conversion.

Example 11

Potassium Hydroxide Added in the First Stage of a Reaction Cannot be Used for the Second Stage of the Reaction Step 1

Preparation of Canola Methyl Ester Using Methanol in the Presence of Potassium Hydroxide Preparation of potassium methoxide for reaction 1. To a dry and clean 100 mL Erlenmeyer flask equipped with a Teflon coated stirring bar was added potassium hydroxide (0.5 g, 0.5% wt/wt). Dry methanol (12 g) was added slowly to the flask with continuous stirring in a fume hood until the catalytic solution is clear.

Reaction 1:

The freshly prepared potassium hydroxide/methanol solution was added to a clean and dry Erlenmeyer flask equipped with a Teflon coated stirring bar. Commercial canola oil, (0.1 mol, 100 g) obtained from a local grocery store was added to the same flask. All the contents were well mixed and allowed to react for two hours under medium stirring. After 2 hours, agitation was stopped and flask contents were transferred to a 200 mL glass separatory funnel. After the separation, two layers could be seen; the upper light and cloudy methyl ester layer and the lower dark and transparent glycerin layer. The lower glycerin layer was drained into a 100 mL round bottom flask while leaving the upper methyl ester layer in the funnel.

Reaction 2:

Twelve grams of dry methanol was added to a 250 mL round bottom flask equipped with a Teflon coated stirring bar. The methyl ester layer from the 1st reaction was transferred into the same flask and stirred for 2 hours in a 70° C. hot water bath. The contents of the flask were then transferred into a glass separatory funnel and allowed to separate overnight. The 2nd reaction did not separate. The NMR studies of the degree of transesterfication from the 2nd reaction does not show any further progress from that of the NMR taken from the 1st conversion.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

We claim:

1. A process of preparing fatty alkyl esters, (biodiesel) comprising:
   a) transesterifying an oil, fat or grease with a solution comprising a lithium base and a monohydric aliphatic alcohol to produce fatty alkyl esters and lithium alkaline glycerin;
   b) separating the fatty alkyl esters from the lithium alkaline glycerin and utilizing the lithium alkaline glycerin to saponify fatty alkyl compounds to produce glycerin and lithium soaps; and
   c) optionally, separating the glycerin and lithium soaps.

2. The process according to claim 1, wherein the lithium base is dissolved in alcohol and subsequently the alkaline alcohol solution is blended with the oil fat or grease.

3. The process according to claim 1, wherein excess monohydric aliphatic alcohol is used and the alkyl ester and unreacted aliphatic alcohol are removed before b).

4. The process according to claim 3, wherein the excess alcohol added to the reaction is in an amount greater than 15% of the weight of the oil, fat or grease.

5. The process according to claim 1 wherein lithium soap particles form as a side product in a) and the lithium soap particles so formed are removed by filtration prior to b).

6. The process according to claim 1 wherein the alkyl ester layer separated in b) is treated with an additional portion of alcoholic lithium base.

7. The process according to claim 3 wherein following the removal of alkyl ester and unreacted aliphatic alcohol, the base concentration of the lithium alkaline glycerin is determined and a stoichiometric portion of fatty alkyl compounds is added to the lithium alkaline glycerin mixture in b).

8. The process according to claim 7, wherein in c) the lithium soaps are separated from the glycerin by filtration through a porous membrane.

9. The process according to claim 8, wherein the filtered lithium soap is combined with lithium soap filtered after transesterification in a) and washed with solvent suitable for removing polar and non-polar contaminants.

10. The process according to claim 1 wherein the glycerin is deionized and excess water is removed therefrom.

11. The process according to claim 8 wherein a solvent is added to the lithium soap and glycerin mixture in b) prior to filtration to enhance precipitation of the lithium soap.

12. The process according to claim 11, wherein the solvent is chilled water.

13. The process according to claim 1 wherein the monohydric aliphatic alcohol is a lower alcohol.

14. The process according to claim 13, wherein the lower alcohol is selected from methanol, ethanol, propanol, isopropanol, amyl alcohol, t-butanol, and an isomeric branched chain alcohol.

15. The process according to claim 14, wherein the lower alcohol is methanol.

16. The process according to claim 1 wherein the fatty alkyl compound is selected from one or more of lecithin, fatty acids, triglyceride, diglycerides, monoglycerides, fatty acid alkyl esters, fatty acid arylesters and fatty anhydrides.

17. The process according to claim 16, wherein the fatty alkyl compound comprises a triglyceride.

18. The process according to claim 1 wherein the lithium base is selected from $LiOH \cdot H_2O$, LiOMe, lithium metal, lithium hydride and lithium propylene glycol (LiPPG).

19. The process according to claim 18, wherein the lithium base is monohydrated lithium hydroxide ($LiOH \cdot H_2O$) or lithium hydride.

20. The process according to claim 18, wherein the catalyst is selected from dry LiH, Li, LiOMe and LiPPG.

21. The process according to claim 1 wherein the fat, oil or grease is selected from one or more of canola oil, soybean oil, palm oil, sunflower oil, safflower oil, flax oil, solin flax oil, mustard seed fixed oil, coriander seed fixed oil, castor oil, chinese tallow tree oil, cocoa butter oil, coconut oil, corn oil, cottonseed oil, crambe oil, evening primrose oil, peanut oil, hemp seed oil, olive oil, poppy seed oil, rapeseed oil, rice bran oil, sesame oil, tea seed oil, wheat germ oil, beef tallow, sheep tallow, pork fat, and chicken fat.

22. The process according to claim 21, wherein the oil is canola oil.

23. The process according to claim 1 wherein the fatty alkyl esters, lithium soaps and glycerin are isolated.

* * * * *